United States Patent
Yuan

(10) Patent No.: US 6,894,405 B2
(45) Date of Patent: May 17, 2005

(54) FACILITY FOR SUPPLYING SPARE OR AUXILIARY POWER SUPPLY TO PROCESSOR DEVICE

(75) Inventor: Lin Hou Yuan, Taipei (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 32 days.

(21) Appl. No.: 10/325,947

(22) Filed: Dec. 23, 2002

(65) Prior Publication Data

US 2003/0122532 A1 Jul. 3, 2003

(30) Foreign Application Priority Data

Dec. 31, 2001 (TW) ........................................ 90133550 A

(51) Int. Cl.[7] ................................................ H02J 1/12
(52) U.S. Cl. .......................................... 307/45; 713/22
(58) Field of Search .............................. 307/44, 82, 85, 307/86, 23, 45, 64; 713/300, 320, 340; 714/14, 22

(56) References Cited

U.S. PATENT DOCUMENTS

| | | | | |
|---|---|---|---|---|
| 4,694,194 A | * | 9/1987 | Hansel et al. | 307/66 |
| 5,758,100 A | * | 5/1998 | Odisho | 710/301 |
| 5,839,081 A | * | 11/1998 | Joao et al. | 701/36 |
| 5,939,799 A | * | 8/1999 | Weinstein | 307/64 |
| 6,275,946 B1 | * | 8/2001 | Meir | 713/300 |
| 6,665,806 B1 | * | 12/2003 | Shimizu | 713/324 |

* cited by examiner

Primary Examiner—Gary L. Laxton
(74) Attorney, Agent, or Firm—Rosenberg, Klein & Lee

(57) ABSTRACT

A power supply facility includes a primary power circuit coupled to energize a CPU, a control circuit coupled to the CPU, and an auxiliary power circuit coupled to the control circuit for supplying electric power to the CPU via the control circuit. A detecting device nay detect the power supply to the CPU, and may actuate the control circuit to couple the auxiliary power circuit to energize the CPU when the primary power circuit is unable to energize the CPU, or when the electric power supplied to the CPU is cut off, or when the power supply is less then the required value.

4 Claims, 4 Drawing Sheets

FACILITY FOR SUPPLYING SPARE OR AUXILIARY POWER SUPPLY TO PROCESSOR DEVICE

BACKGROUND OF THE INVENTION

1. Field of the Invention

The present invention relates to a power supply facility and more particularly to a power supply facility for supplying primary and spare or auxiliary or secondary power supplies to processor devices.

2. Description of the Prior Art

Typical computer facilities comprise a power supply device for providing electric energy to energize the processor devices thereof. However, once the electric power supply to the computer facilities is cut off, the electric energy to the processor devices may also be cut off right away, such that some of the works done or typed or keyed into the computer facilities may not be stored into the memorizing devices of the computer facilities.

Some of additional or auxiliary power suppliers may typically be provided and coupled to the computer facilities to provide spare or auxiliary power supply to the computer facilities when the electric power supply to the computer facilities is cut off. However, the users may have to purchase and couple the additional or auxiliary power suppliers to the computer facilities by themselves. In addition, the additional or auxiliary power suppliers may probably not compatible or suitable for the computer facilities.

The present invention has arisen to mitigate and/or obviate the afore-described disadvantages of the conventional power supply devices.

SUMMARY OF THE INVENTION

The primary objective of the present invention is to provide a power supply facility for supplying primary and spare or auxiliary or secondary power supplies to processor devices in order to energize the processor devices of the computer facilities when the electric power supply to the computer facilities is cut off.

In accordance with one aspect of the invention, there is provided a power supply facility comprising a CPU, a primary power circuit coupled to the CPU for supplying electric power to energize the CPU, a control circuit coupled to the CPU, an auxiliary power circuit coupled to the control circuit for supplying electric power to energize the CPU via the control circuit, and means for detecting whether the primary power circuit can energize the CPU, and actuating the auxiliary power circuit to energize the CPU when the primary power circuit is unable to energize the CPU, or when the electric power supplied to the CPU is cut off, or when the power supply to the CPU has been detected to be less then the required or predetermined voltage or value by the detecting means.

The detecting means includes a detecting circuit coupled between the CPU and the primary power circuit, to detect power supply from the primary power circuit to the CPU.

The detecting circuit is coupled to the control circuit to actuate the control circuit to selectively couple the auxiliary power circuit to the CPU. The control circuit includes a switch to selectively couple the auxiliary power circuit to the CPU when the primary power circuit is unable to energize the CPU.

A circuit board may further be provided and may have the auxiliary power circuit and the primary power circuit and the detecting circuit provided therein.

Alternatively, the circuit board may include a socket provided therein, and a card may have the auxiliary power circuit and the primary power circuit and the detecting circuit provided therein, for selectively plugging to the socket of the circuit board.

Further objectives and advantages of the present invention will become apparent from a careful reading of a detailed description provided herein below, with appropriate reference to accompanying drawings.

DETAILED DESCRIPTION OF THE PREFERRED EMBODIMENT

Figure 1:
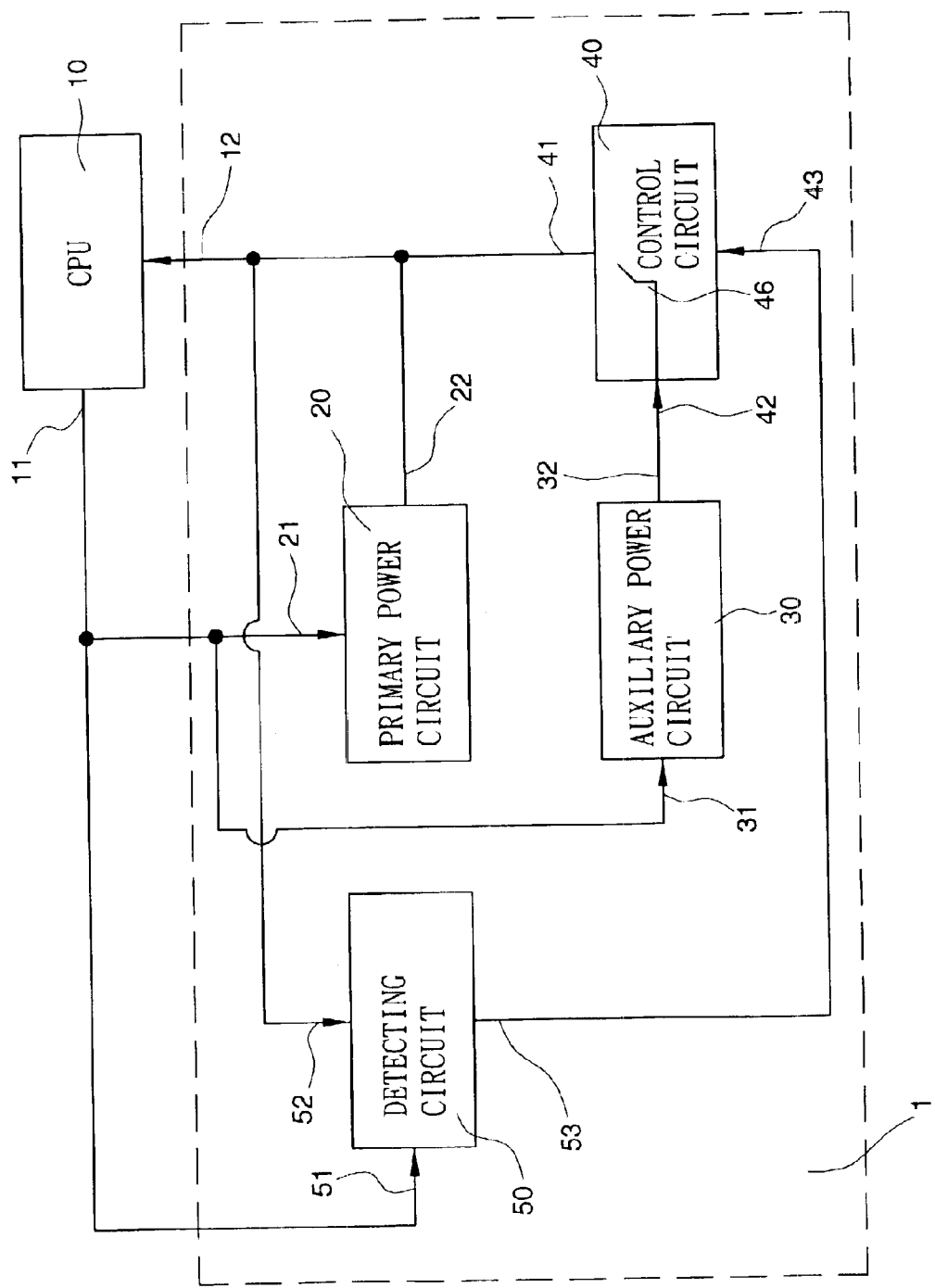
FIG. 1 is a plan schematic view illustrating an electric circuit of a power supply facility in accordance with the present invention.

Referring to the drawings, and initially to FIG. 1, a power supply facility in accordance with the present invention comprises a power supply device 1 for coupling to a processor device or a central processor unit (CPU) 10 of a computer facility, and for selectively supplying a primary power supply and a spare or secondary or auxiliary power supply to the CPU 10.

The power supply device 1 includes a primary power device or circuit 20 having a terminal 21 coupled to a terminal 11 of the CPU 10, for supplying primary electric power to the CPU 10; and includes a spare or secondary or auxiliary power device or circuit 30 for selectively supplying the electric power to the CPU 10, when required.

For example, the auxiliary power circuit 30 includes a terminal 31 coupled between the terminals 11, 21 of the CPU 10 and the primary power circuit 20, and control terminal 32 coupled to a terminals 42 of a control circuit 40, which has another terminal 41 coupled to another terminal 12 of the CPU 10.

The primary power circuit 20 includes another terminal 22 coupled between the terminals 12, 41 of the CPU 10 and the control circuit 40, for allowing the primary power circuit 20 to supply the primary electric power to the CPU 10. The control circuit 40 includes such as a switch device 46 for selectively coupling the auxiliary power circuit 30 to the CPU 10.

The power supply device 1 further includes a detecting circuit 50 having two terminals 51m 52 coupled to the terminals 11,12 of the CPU 10 respectively, for detecting the power supplies or the voltages of the terminals 11, 12 of the CPU 10 respectively.

The detecting circuit 50 includes another terminal 53 coupled to a further terminal 43 of the control circuit 40, in order to actuate the control circuit 40 to couple the auxiliary power circuit 30 to the CPU 10 when the detecting circuit 50 detects that the power primary circuit 20 is less then the required or predetermined voltage or value.

In operation, the primary power circuit 20 may be arranged to continuously or constantly supply electric power to the CPU 10. When the electric power of the primary power circuit 20 is cut off or is less then the required or predetermined voltage or value, or is unable to energize the CPU 10, or when the power supply to the CPU 10 has been detected to be less then the required or predetermined voltage or value by the detecting circuit 50, the detecting circuit 50 may actuate the control circuit 40 to couple the auxiliary power circuit 30 to the CPU 10, and thus to supply the electric power energy to the CPU 10 when required.

Figure 2:
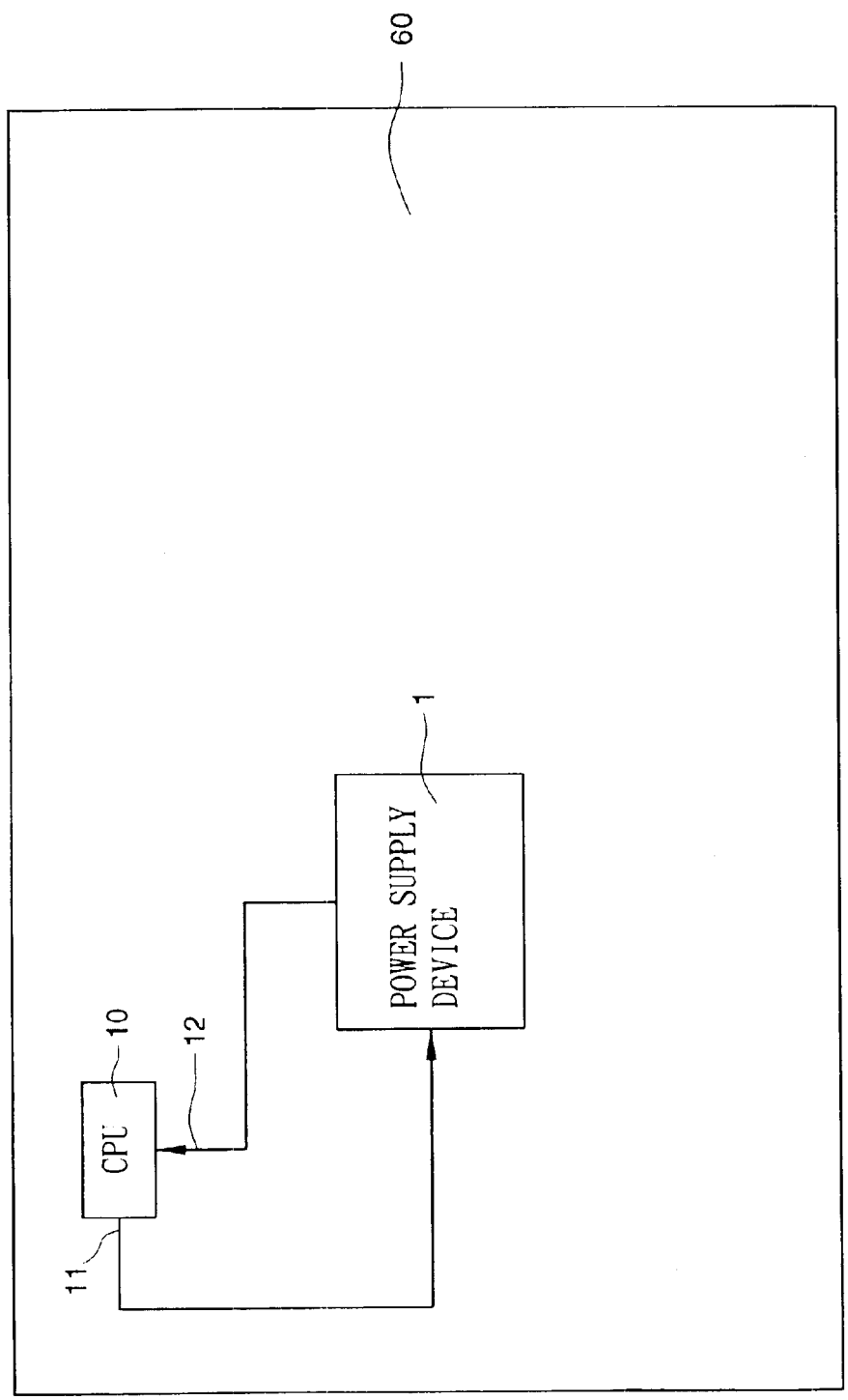
FIG. 2 is a plan schematic view illustrating the attachment of the electric circuit of the power supply facility to a circuit board.

Referring, next to FIG. 2, the power supply device 1 may be directly engaged into or built in a circuit board 60, and coupled to the CPU 10 for selectively secondary or auxiliary power supply to the CPU 10.

Figure 3:
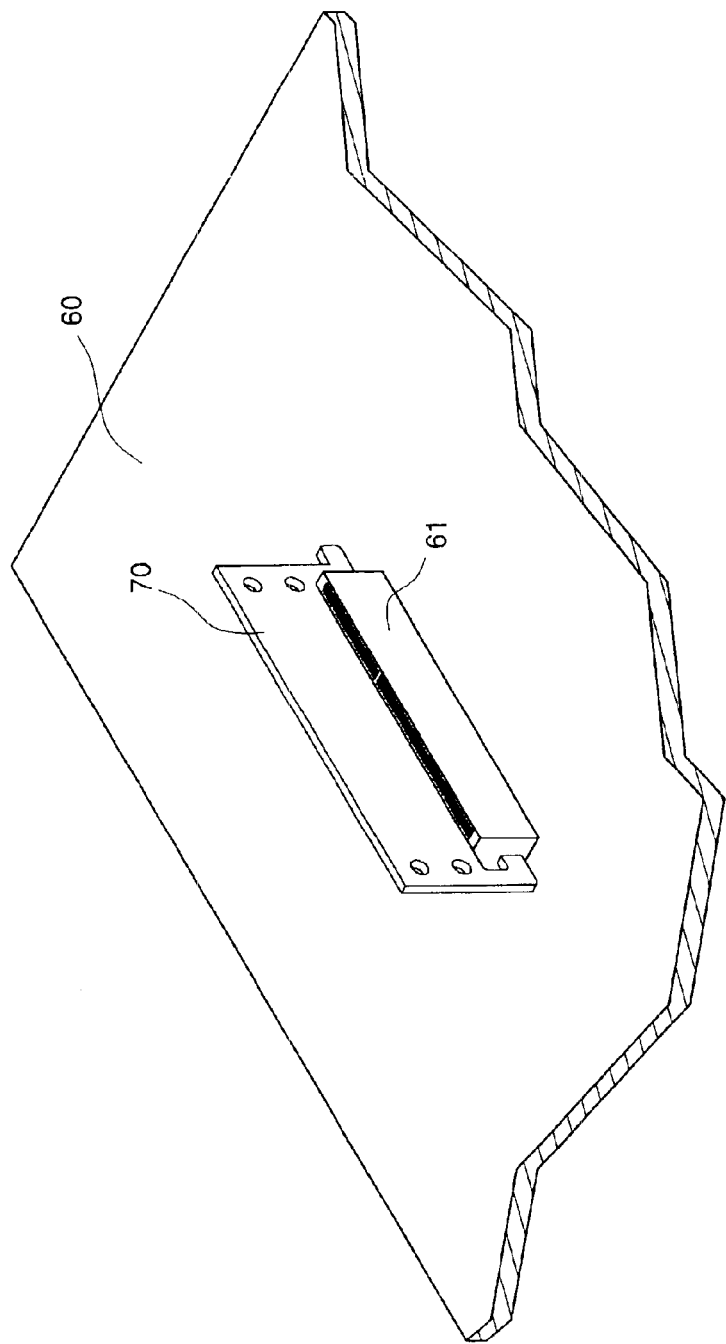
FIG. 3 is a partial perspective view illustrating the other arrangement or attachment of the electric circuit of the power supply facility to the circuit board.

Referring next to FIG. 3, alternatively, the power supply device 1 may be provided or engaged in or built in a card member 70 which may then plugged to a socket 61 of the circuit board 60, and coupled to the CPU 10 for selectively supplying a primary power supply and a spare or secondary or auxiliary power supply to the CPU 10.

Figure 4:
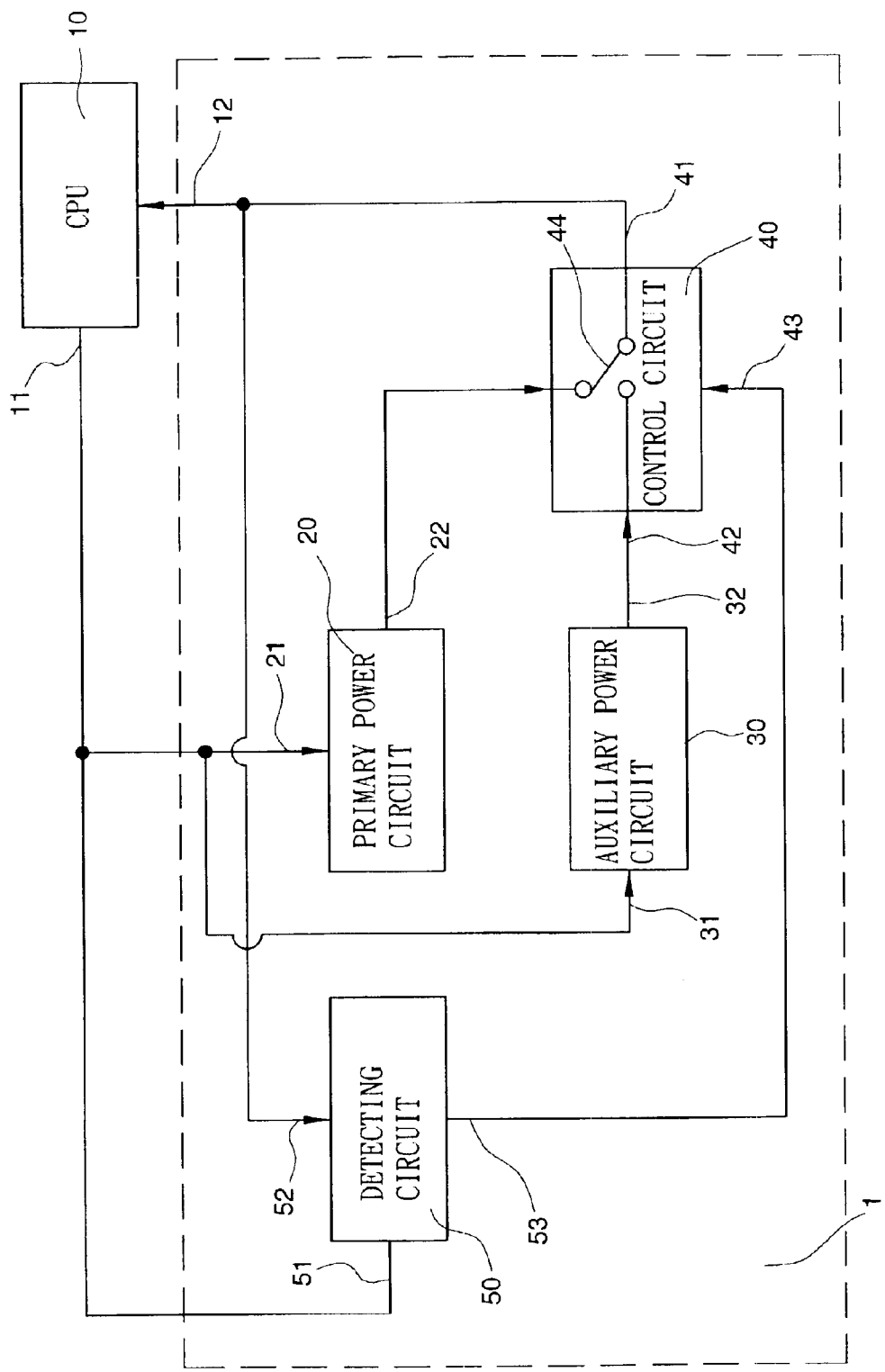
FIG. 4 is a plan schematic view similar to FIG. 1, illustrating another arrangement of the electric circuit of the power supply facility.

Referring next to FIG. 4, alternatively, the other terminal 22 of the primary power circuit power circuit 20 may be coupled to a further terminal 44 of the control circuit 40. The switch device 46 of the control circuit 40 may selectively couple the primary power circuit 20 and the auxiliary power circuit 30 to the CPU 10.

Accordingly, the power supply facility in accordance with the present invention may be used for supplying primary and spare or auxiliary or secondary power supplies to the processor devices, in order to energize the processor devices of the computer facilities when the electric power supply to the computer facilities is cut off.

Although this invention has been described with a certain degree of particularity, it is to be understood that the present disclosure has been made by way of example only and that numerous changes in the detailed construction and the combination and arrangement of parts nay be resorted to without departing from the spirit and scope of the invention as hereinafter claimed.

I claim:

1. A power supply facility comprising:
   a CPU having a first power terminal and a second power terminal,
   a primary power circuit having a pair of terminals respectively coupled to said first and second power terminals of said CPU for supplying electric power to energize said CPU,
   an auxiliary power circuit having a first terminal coupled to said first power terminal of said CPU and a second terminal,
   a detecting circuit having a pair of input terminals respectively coupled to said first and second power terminals of said CPU and an output terminal for generating an actuation signal responsive to an insufficient power level being supplied by said primary power circuit, and
   a control circuit having a first input coupled to said second terminal of said auxiliary power circuit and an output terminal coupled to said second power terminal of said CPU, said control circuit having a second input terminal coupled to said output terminal of said detecting circuit for coupling said second terminal of said auxiliary power circuit to said second power terminal of said CPU responsive to receipt of said actuation signal for supplementing electric power from said primary power circuit.

2. The power supply facility according to claim 1, wherein said control circuit includes a switch to selectively couple said second terminal of said auxiliary power circuit to said second power terminal of said CPU.

3. The power supply facility according to claim 1, further comprising a circuit board, said auxiliary power circuit and said primary power circuit and said detecting circuit being disposed on said circuit board.

4. The power supply facility according to claim 1, further comprising a circuit board including a socket provided thereon, and a card including said auxiliary power circuit and said primary power circuit and said detecting circuit provided thereon, for plugging to said socket of said circuit board.

* * * * *